US007830962B1

(12) United States Patent
Fernandez et al.

(10) Patent No.: US 7,830,962 B1
(45) Date of Patent: Nov. 9, 2010

(54) MONITORING REMOTE PATIENTS

(76) Inventors: Dennis S. Fernandez, 1175 Osborn Ave., Atherton, CA (US) 94027; Irene Y. Hu, 1240 Avon St., Belmont, CA (US) 94002

( * ) Notice: Subject to any disclaimer, the term of this patent is extended or adjusted under 35 U.S.C. 154(b) by 219 days.

(21) Appl. No.: 11/394,554

(22) Filed: Mar. 31, 2006

Related U.S. Application Data

(60) Continuation of application No. 09/823,508, filed on Mar. 29, 2001, which is a division of application No. 09/045,412, filed on Mar. 19, 1998, now Pat. No. 6,697,103.

(51) Int. Cl.
*H04B 1/66* (2006.01)
(52) U.S. Cl. .................................. 375/240.16
(58) Field of Classification Search ......... 348/148–169, 348/170; 340/905; 600/301, 508; 702/188; 375/240.16; *H04N 1/66*
See application file for complete search history.

(56) References Cited

U.S. PATENT DOCUMENTS

| | | | |
|---|---|---|---|
| 4,237,344 A | 12/1980 | Moore | |
| 4,511,886 A | 4/1985 | Rodriguez | |
| 4,524,384 A | 6/1985 | Lefkowitz et al. | |
| 4,591,823 A | 5/1986 | Horvat | |
| 4,737,847 A | 4/1988 | Araki et al. | |
| 4,799,156 A | 1/1989 | Shavitt et al. | |
| 4,802,008 A | 1/1989 | Walling | |
| 4,843,377 A | 6/1989 | Fuller et al. | |
| 4,860,352 A | 8/1989 | Laurance et al. | |
| 4,965,574 A | 10/1990 | Fukushima et al. | |
| 4,992,866 A | 2/1991 | Morgan | |
| 4,994,971 A | 2/1991 | Poelstra | |
| 5,063,603 A | 11/1991 | Burt | |
| 5,119,102 A | 6/1992 | Barnard | |
| 5,151,684 A | 9/1992 | Johnsen | |
| 5,202,661 A | 4/1993 | Everett, Jr. | |
| 5,204,670 A | 4/1993 | Stinton | |
| 5,223,844 A | 6/1993 | Mansell et al. | |
| 5,243,418 A | 9/1993 | Kuno | |
| 5,266,944 A | 11/1993 | Carroll et al. | |
| 5,303,393 A | 4/1994 | Noreen et al. | |
| 5,335,180 A | 8/1994 | Takahashi et al. | |
| 5,348,008 A | 9/1994 | Bornn et al. | |
| 5,365,217 A | 11/1994 | Toner | |
| 5,396,429 A * | 3/1995 | Hanchett | 701/117 |
| 5,416,695 A | 5/1995 | Stutman et al. | |
| 5,441,047 A * | 8/1995 | David et al. | 600/483 |
| 5,444,442 A | 8/1995 | Sadakata | |
| 5,448,484 A | 9/1995 | Bullock et al. | |
| 5,455,625 A | 10/1995 | Englander | |
| 5,515,285 A | 5/1996 | Garrett, Sr. et al. | |
| 5,517,683 A | 5/1996 | Collett et al. | |

(Continued)

OTHER PUBLICATIONS

Office Action dated Feb. 18, 2010 for U.S. Appl. No. 09/823,506.

(Continued)

*Primary Examiner*—Tung Vo
(74) *Attorney, Agent, or Firm*—Snell & Wilmer L.L.P.

(57) ABSTRACT

Integrated imaging and GPS network monitors remote object movement. Browser interface displays objects and detectors. Database stores object position movement. Cameras detect objects and generate image signal. Internet provides selectable connection between system controller and various cameras according to object positions.

21 Claims, 4 Drawing Sheets

U.S. PATENT DOCUMENTS

| | | | |
|---|---|---|---|
| 5,539,429 A | | 7/1996 | Yano et al. |
| 5,544,649 A | * | 8/1996 | David et al. ............... 600/301 |
| 5,546,072 A | | 8/1996 | Creuseremee et al. |
| 5,553,609 A | * | 9/1996 | Chen et al. ............... 600/301 |
| 5,554,983 A | | 9/1996 | Kitamura et al. |
| 5,564,429 A | * | 10/1996 | Bornn et al. ............... 600/508 |
| 5,574,427 A | | 11/1996 | Cavallaro |
| 5,576,952 A | | 11/1996 | Stutman et al. |
| 5,581,630 A | | 12/1996 | Bonneau, Jr. |
| 5,594,410 A | | 1/1997 | Lucas et al. |
| 5,597,335 A | | 1/1997 | Woodland |
| 5,598,460 A | | 1/1997 | Tendler |
| 5,603,054 A | | 2/1997 | Theimer et al. |
| 5,615,132 A | | 3/1997 | Horton et al. |
| 5,617,100 A | | 4/1997 | Akiyoshi et al. |
| 5,627,549 A | | 5/1997 | Park |
| 5,633,946 A | | 5/1997 | Lachinski et al. |
| 5,644,386 A | | 7/1997 | Jenkins et al. |
| 5,664,948 A | | 9/1997 | Dimitriadis et al. |
| 5,673,305 A | | 9/1997 | Ross |
| 5,684,476 A | * | 11/1997 | Anderson ............... 340/988 |
| 5,686,888 A | | 11/1997 | Welles, II et al. |
| 5,687,717 A | | 11/1997 | Halpern et al. |
| 5,689,431 A | | 11/1997 | Rudow et al. |
| 5,689,442 A | * | 11/1997 | Swanson et al. ............ 380/241 |
| 5,694,322 A | | 12/1997 | Westerlage et al. |
| 5,699,258 A | | 12/1997 | Thiel |
| 5,701,400 A | | 12/1997 | Amado |
| 5,705,980 A | | 1/1998 | Shapiro |
| 5,712,899 A | | 1/1998 | Pace, II |
| 5,722,418 A | | 3/1998 | Bro |
| 5,726,660 A | | 3/1998 | Purdy et al. |
| 5,734,981 A | | 3/1998 | Kennedy, III et al. |
| 5,742,233 A | | 4/1998 | Hoffman et al. |
| 5,742,509 A | | 4/1998 | Goldberg et al. |
| 5,745,036 A | | 4/1998 | Clare |
| 5,748,103 A | | 5/1998 | Flach |
| 5,751,289 A | * | 5/1998 | Myers ............... 345/419 |
| 5,752,976 A | | 5/1998 | Duffin et al. |
| 5,758,329 A | | 5/1998 | Wojcik et al. |
| 5,764,786 A | * | 6/1998 | Kuwashima et al. ........ 382/107 |
| 5,767,505 A | | 6/1998 | Mertens |
| 5,769,269 A | | 6/1998 | Peters |
| 5,774,040 A | | 6/1998 | Lastoria |
| 5,774,070 A | | 6/1998 | Rendon |
| 5,777,662 A | | 7/1998 | Zimmerman |
| 5,785,650 A | | 7/1998 | Akasaka et al. |
| 5,786,746 A | * | 7/1998 | Lombardo et al. ..... 340/286.07 |
| 5,801,618 A | | 9/1998 | Jenkins |
| 5,806,005 A | | 9/1998 | Hull et al. |
| 5,809,161 A | | 9/1998 | Auty et al. |
| 5,815,093 A | | 9/1998 | Kikinis |
| 5,818,733 A | * | 10/1998 | Hyuga ............... 702/188 |
| 5,825,283 A | | 10/1998 | Camhi |
| 5,835,061 A | | 11/1998 | Stewart |
| 5,845,265 A | | 12/1998 | Woolston |
| 5,848,064 A | | 12/1998 | Cowan |
| 5,862,511 A | | 1/1999 | Croyle |
| 5,867,484 A | | 2/1999 | Shaunfield |
| 5,867,821 A | | 2/1999 | Ballantyne et al. |
| 5,870,471 A | | 2/1999 | Wootton et al. |
| 5,872,539 A | | 2/1999 | Mullen |
| 5,902,234 A | * | 5/1999 | Webb ............... 600/300 |
| 5,910,789 A | | 6/1999 | Vigen |
| 5,915,001 A | | 6/1999 | Uppaluru |
| 5,923,365 A | | 7/1999 | Tamir et al. |
| 5,924,040 A | | 7/1999 | Trompower |
| 5,930,723 A | | 7/1999 | Heiskari et al. |
| 5,933,811 A | | 8/1999 | Angles et al. |
| 5,947,040 A | | 9/1999 | Gregor |
| 5,948,040 A | | 9/1999 | DeLorme et al. |
| 5,955,973 A | | 9/1999 | Anderson |
| 5,959,577 A | | 9/1999 | Fan et al. |
| 5,959,580 A | | 9/1999 | Maloney et al. |
| 5,960,085 A | | 9/1999 | de la Huerga |
| 5,961,446 A | * | 10/1999 | Beller et al. ............... 600/300 |
| 5,963,148 A | | 10/1999 | Sekine et al. |
| 5,969,755 A | | 10/1999 | Courtney |
| 5,970,481 A | | 10/1999 | Westerlage et al. |
| 5,982,298 A | * | 11/1999 | Lappenbusch et al. ...... 340/905 |
| 5,987,519 A | * | 11/1999 | Peifer et al. ............... 709/230 |
| 5,993,001 A | | 11/1999 | Bursell et al. |
| 6,006,159 A | | 12/1999 | Schmier et al. |
| 6,009,359 A | | 12/1999 | El-Hakim et al. |
| 6,018,697 A | | 1/2000 | Morimoto et al. |
| 6,018,713 A | | 1/2000 | Coli et al. |
| 6,021,371 A | | 2/2000 | Fultz |
| 6,037,991 A | | 3/2000 | Thro et al. |
| 6,039,258 A | | 3/2000 | Durbin et al. |
| 6,047,234 A | | 4/2000 | Cherveny et al. |
| 6,047,270 A | | 4/2000 | Joao et al. |
| 6,049,711 A | | 4/2000 | Ben-Yehezkel et al. |
| 6,052,598 A | | 4/2000 | Rudrapatna et al. |
| 6,055,426 A | | 4/2000 | Beasley |
| 6,055,434 A | | 4/2000 | Seraj |
| 6,055,514 A | | 4/2000 | Wren |
| 6,058,379 A | | 5/2000 | Odom et al. |
| 6,058,422 A | | 5/2000 | Ayanoglu et al. |
| 6,072,396 A | | 6/2000 | Gaukel |
| 6,080,063 A | | 6/2000 | Khosia |
| 6,084,510 A | | 7/2000 | Lemelson et al. |
| 6,089,456 A | | 7/2000 | Walsh et al. |
| 6,091,956 A | | 7/2000 | Hollenberg |
| 6,104,334 A | | 8/2000 | Allport |
| 6,111,541 A | | 8/2000 | Karmel |
| 6,112,085 A | | 8/2000 | Garner et al. |
| 6,115,646 A | | 9/2000 | Fiszman et al. |
| 6,122,573 A | | 9/2000 | Higashi et al. |
| 6,128,571 A | | 10/2000 | Ito et al. |
| 6,144,848 A | | 11/2000 | Walsh et al. |
| 6,151,582 A | | 11/2000 | Huang et al. |
| 6,154,693 A | | 11/2000 | Aberschitz et al. |
| 6,175,382 B1 | | 1/2001 | Mohr |
| 6,182,053 B1 | | 1/2001 | Rauber et al. |
| 6,188,939 B1 | | 2/2001 | Morgan et al. |
| 6,198,394 B1 | | 3/2001 | Jacobsen et al. |
| 6,199,099 B1 | * | 3/2001 | Gershman et al. ........... 709/203 |
| 6,212,550 B1 | | 4/2001 | Segur |
| 6,218,961 B1 | | 4/2001 | Gross et al. |
| 6,243,574 B1 | | 6/2001 | McGregor et al. |
| 6,249,241 B1 | * | 6/2001 | Jordan et al. ............... 342/41 |
| 6,272,457 B1 | | 8/2001 | Ford et al. |
| 6,297,748 B1 | | 10/2001 | Lappenbusch et al. |
| 6,301,480 B1 | | 10/2001 | Kennedy, III et al. |
| 6,314,089 B1 | | 11/2001 | Szlam et al. |
| 6,331,872 B1 | | 12/2001 | Hyuga |
| 6,351,640 B1 | | 2/2002 | DeMont |
| 6,356,758 B1 | | 3/2002 | Almeida et al. |
| 6,373,508 B1 | * | 4/2002 | Moengen ............... 715/848 |
| 6,374,098 B1 | | 4/2002 | Raith et al. |
| 6,377,821 B2 | | 4/2002 | Forlenzo et al. |
| 6,400,816 B1 | | 6/2002 | Hjalmtysson et al. |
| 6,442,276 B1 | | 8/2002 | Doljack |
| 6,522,883 B2 | | 2/2003 | Titmuss et al. |
| 6,529,824 B1 | | 3/2003 | Obradovich et al. |
| 6,697,103 B1 | * | 2/2004 | Fernandez et al. .......... 348/143 |
| 6,700,494 B2 | | 3/2004 | Dowd |
| 6,724,421 B1 | | 4/2004 | Glatt |
| 6,741,161 B1 | | 5/2004 | Kim et al. |
| 6,847,822 B1 | | 1/2005 | Dennison et al. |
| 7,085,775 B2 | | 8/2006 | Short, III et al. |
| 7,412,396 B1 | | 8/2008 | Haq |
| 2001/0051881 A1 | | 12/2001 | Filler |
| 2003/0229514 A2 | | 12/2003 | Brown |

2004/0005914 A1  1/2004  Dear

OTHER PUBLICATIONS

Advisory Action dated Sep. 21, 2009 for U.S. Appl. No. 09/823,508.
Advisory Action dated Jan. 27, 2010 for U.S. Appl. No. 09/823,509.
Restriction Requirement dated Dec. 31, 2008 for U.S. Appl. No. 09/823,089.
Notice of Abandonment dated Sep. 25, 2009 for U.S. Appl. No. 09/823,089.
Final Office Action dated Jan. 26, 2010 for U.S. Appl. No. 11/585,449.
BPAI Decision dated Sep. 29, 2008 for U.S. Appl. No. 09/823,089.
BPAI Decision dated Sep. 3, 2008 for U.S. Appl. No. 09/823,508.
Examiner's Answer dated May 29, 2007 for U.S. Appl. No. 09/823,508.
Examiner's Answer dated May 24, 2007 for U.S. Appl. No. 09/823,089.
http://www.zdnet.com/icom/news/199706/05/news3.html.
Office Action dated Dec. 31, 2008 for U.S. Appl. No. 09/823,089.
Intrinsyc Announces Server for Embedded Computer Applications; Internet Computing; Jun. 5, 1997.
Office Action dated Jan. 12, 2005 for U.S. Appl. No. 09/823,509.
Final Office Action dated Jan. 14, 2005 for U.S. Appl. No. 09/823,506.
Final Office Action dated Jan. 18, 2007 for U.S. Appl. No. 09/823,506.
Final Office Action dated Jan. 26, 2004 for U.S. Appl. No. 09/823,506.
Final Office Action dated Oct. 13, 2005 for U.S. Appl. No. 09/823,509.
Final Office Action dated Oct. 13, 2005 for U.S. Appl. No. 09/823,506.
Final Office Action dated Oct. 13, 2005 for U.S. Appl. No. 09/823,089.
Office Action dated Oct. 27, 2003 for U.S. Appl. No. 09/823,508.
Office Action dated Oct. 20, 2006 for U.S. Appl. No. 09/823,506.
Office Action dated Oct. 24, 2007 for U.S. Appl. No. 09/823,509.
Office Action dated Oct. 31, 2003 for U.S. Appl. No. 09/823,506.
Office Action dated Oct. 5, 2004 for U.S. Appl. No. 09/823,508.
Office Action dated Nov. 5, 2001 for U.S. Patent No. 6,697,103.
Office Action dated Feb. 22, 2006 for U.S. Appl. No. 09/823,506.
Office Action dated Feb. 22, 2006 for U.S. Appl. No. 09/823,509.
Office Action dated Feb. 28, 2002 for U.S. Patent No. 6,697,103.
Final Office Action dated Feb. 5, 2004 for U.S. Appl. No. 09/823,508.
Office Action dated Mar. 12, 2007 for U.S. Appl. No. 09/823,509.
Office Action dated Mar. 17, 2008 for U.S. Appl. No. 11/585,449.
Office Action dated Apr. 28, 2003 for U.S. Patent No. 6,697,103.
Final Office Action dated Apr. 27, 2005 for U.S. Appl. No. 09/823,509.
Office Action dated May 1, 2006 for U.S. Appl. No. 09/823,508.
Office Action dated May 2, 2005 for U.S. Appl. No. 09/823,089.
Office Action dated May 21, 2002 for U.S. Patent No. 6,697,103.
Final Office Action dated May 24, 2006 for U.S. Appl. No. 09/823,509.
Office Action dated Jun. 26, 2008 for U.S. Appl. No. 09/823,506.
Final Office Action dated Jun. 7, 2006 for U.S. Appl. No. 09/823,506.
Office Action dated Jun. 13, 2000 for U.S. Patent No. 6,697,103.
Office Action dated Jun. 10, 2005 for U.S. Appl. No. 09/823,508.
Office Action dated Jul. 12, 2005 for U.S. Appl. No. 09/823,506.
Final Office Action dated Jul. 12, 2006 for U.S. Appl. No. 09/823,508.
Office Action dated Jul. 22, 2005 for U.S. Appl. No. 09/823,509.
Office Action dated Jul. 29, 2005 for U.S. Appl. No. 09/823,089.
Final Office Action dated Jul. 3, 2008 for U.S. Appl. No. 09/823,509.
Final Office Action dated Aug. 16, 2005 for U.S. Appl. No. 09/823,508.
Final Office Action dated Aug. 21, 2002 for U.S. Patent No. 6,697,103.
Office Action dated Sep. 2, 2004 for U.S. Appl. No. 09/823,506.
Final Office Action dated Sep. 26, 2008 for U.S. Appl. No. 11/585,449.
Office Action dated Mar. 19, 1998 for U.S. Patent No. 6,697,103.
Notice of Allowance dated Aug. 26, 2003 for U.S. Patent No. 6,697,103.
Final Office Action dated Jan. 14, 2005 for U.S. Appl. No. 09/823,508.
Final Office Action dated Oct. 8, 2009 for U.S. Appl. No. 09/823,506.
Office Action dated May 20, 2009 for U.S. Appl. No. 09/823,506.
Final Office Action dated Dec. 31, 2008 for U.S. Appl. No. 09/823,506.
Final Office Action dated Jul. 9, 2009 for U.S. Appl. No. 09/823,508.
Office Action dated Dec. 31, 2008 for U.S. Appl. No. 09/823,508.
Final Office Action dated Nov. 19, 2009 for U.S. Appl. No. 09/823,509.
Office Action dated May 7, 2009 for U.S. Appl. No. 09/823,509.
Office Action dated Nov. 28, 2008 for U.S. Appl. No. 09/823,509.
Office Action dated Jul. 20, 2009 for U.S. Appl. No. 11/585,449.
Office Action dated Dec. 30, 2008 for U.S. Appl. No. 11/585,449.
Final Office Action dated Nov. 27, 2001 for U.S. Patent No. 6,697,103.
Office Action dated Jul. 14, 2010 for U.S. Appl. No. 09/823,509.
Notice of Allowance dated Jun. 4, 2010 for U.S. Appl. No. 09/823,508.
Notice of Allowance dated Jul. 27, 2010 for U.S. Appl. No. 09/823,506.
Notice of Allowance dated Jul. 27, 2010 for U.S. Appl. No. 11/585,449.
Supplemental Office Action dated Aug. 30, 2010 for U.S. Appl. No. 09/823,509.

* cited by examiner

MONITORING REMOTE PATIENTS

CROSS-REFERENCE TO RELATED APPLICATION

This application is a continuation of U.S. patent application Ser. No. 09/823,508, filed on Mar. 29, 2001, which is a divisional of U.S. patent application Ser. No. 09/045,412, filed on Mar. 19, 1998, now issued as a U.S. Pat. No. 6,697,103.

FIELD OF THE INVENTION

The invention relates to remote surveillance and communications technology, particularly to integrated fixed and mobile network electronics and related software for object attribute processing.

BACKGROUND OF THE INVENTION

Remote or local object monitoring schemes have been used for various specific surveillance applications, such as closed-circuit security video systems, as well as wireless mobile navigation systems using relatively near reference or distant satellite signals (e.g., Global Positioning Satellite system (GPS)). Prior techniques and systems for remotely monitoring typically provide positional or visual information of interest about certain object context, e.g., bank facility surveillance (see: U.S. Pat. Nos. 4,524,384, 4,511,886), or trucking vehicle movement (see: U.S. Pat. Nos. 5,673,305, 5,223,844); however, such prior art schemes are necessarily limited to addressing either fixed or mobile context specifically for which the particular monitoring system has been designed originally.

Hence, there is need for more flexible and scaleable solution for monitoring and processing remote objects according to various more general context and related object conditions.

SUMMARY OF THE INVENTION

The invention resides in an integrated fixed and/or wireless network and associated database and software functionality for monitoring and processing remote and/or local moveable objects. Preferably, the system implementation integrates single-chip digital imaging camera and Global Positioning Satellite system (GPS) receivers through generally accessible server processors using the Internet network and a software browser or functionally equivalent interface coupled thereto for monitoring and analyzing remote or local movement of one or more objects.

An object database or functionally equivalent data structure provided in digital storage and accessible to control software dynamically stores one or more positional and relative movement as well as optional associated map data. Various digital cameras preferably disposed at certain fixed and/or movable locations detect mobile objects and generate object image signal for processing thereof as described herein for applications.

DETAILED DESCRIPTION

Figure 1:
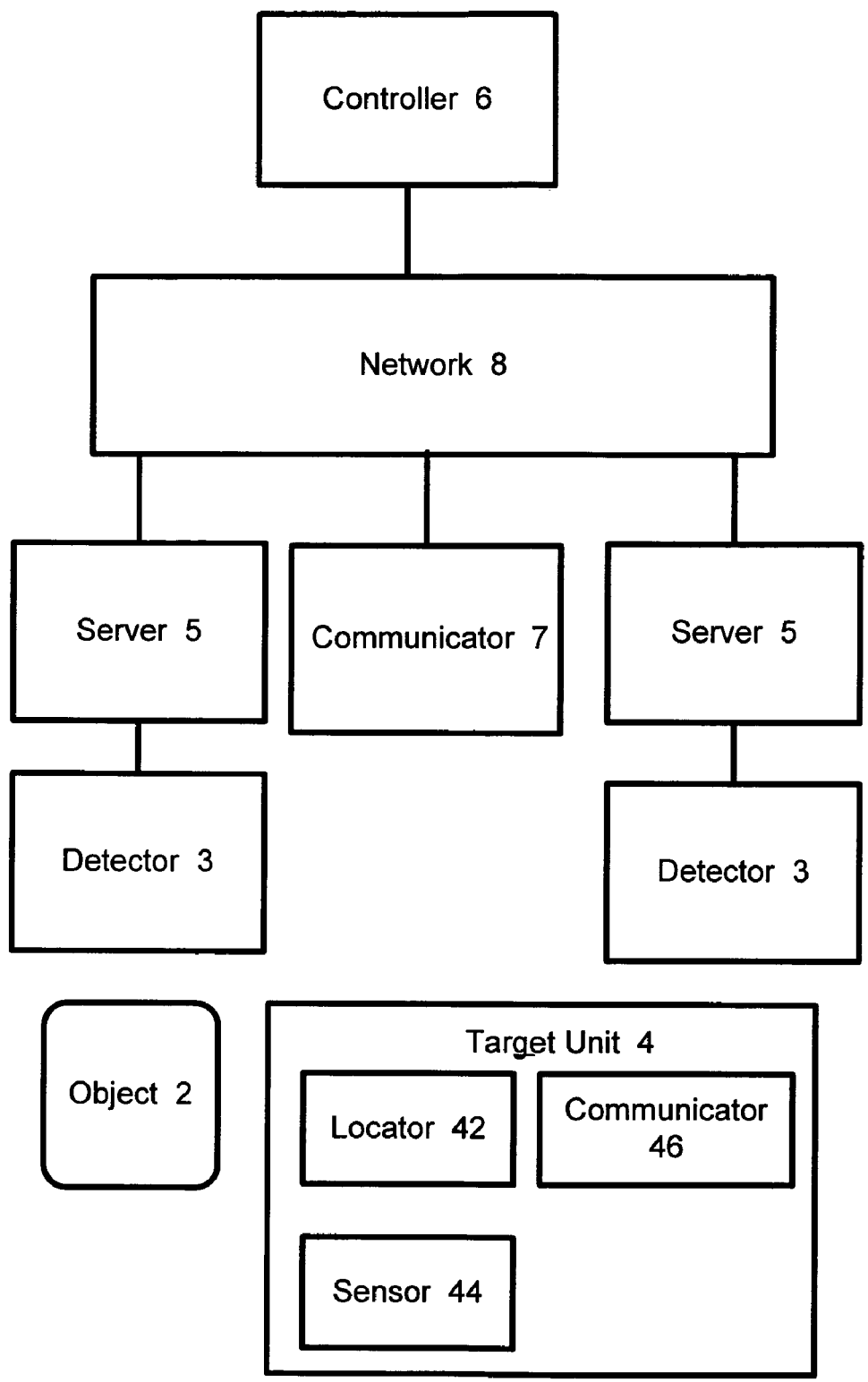
FIG. 1 is a general block diagram of an integrated fixed and mobile system for monitoring and analyzing remote or local object(s) according to the present invention.
Figure 2:
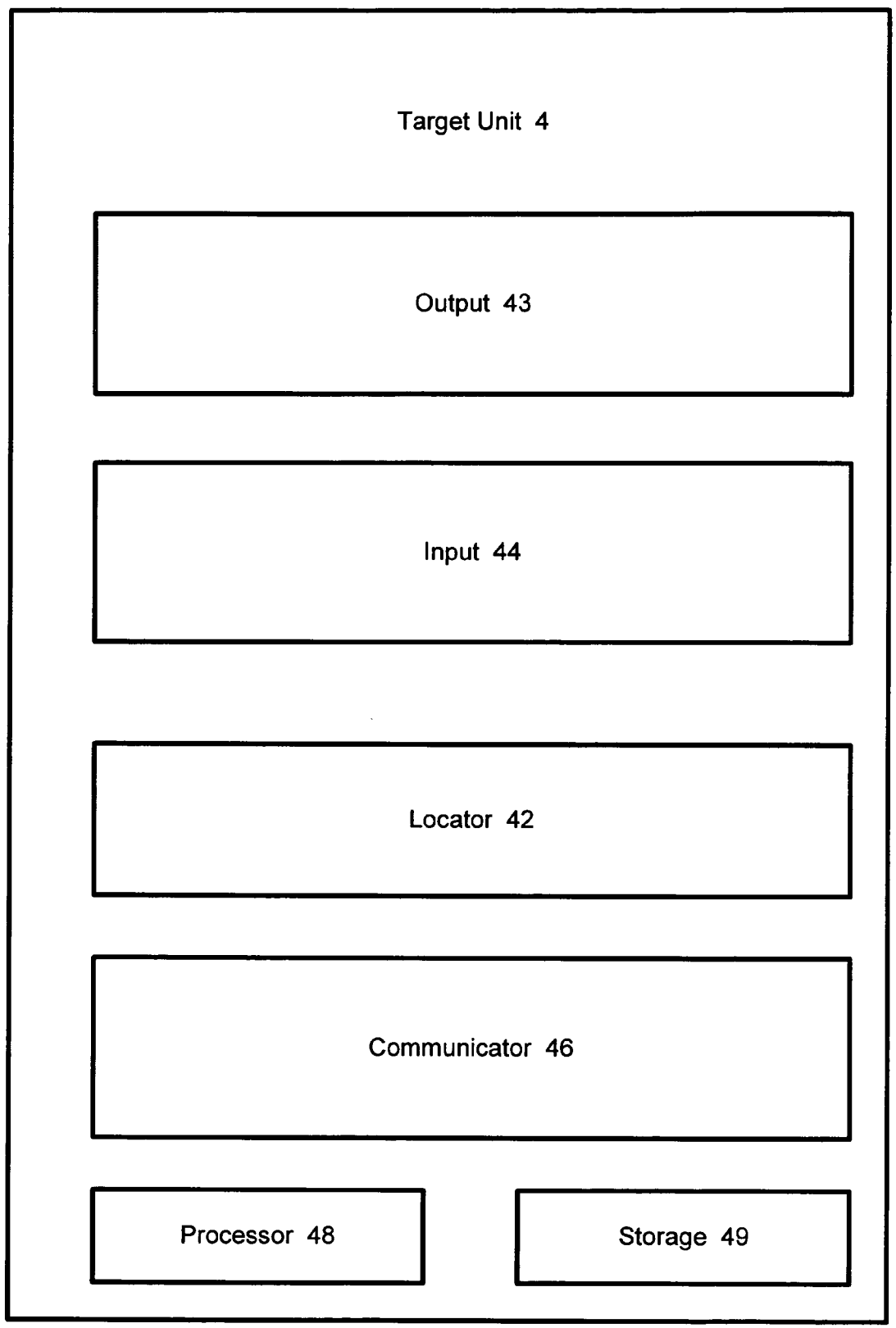
FIG. 2 is a more detailed block diagram of target unit 4 of FIG. 1 provided according to the present invention.

FIG. 1 illustrates a general block diagram of preferred embodiment of integrated fixed and/or mobile network system or apparatus for performing real-time, historical and/or predictive monitoring and data processing of one or more remote or local objects 2. As used herein, the term "object" is construed broadly to include any singular or multiple, wired or wireless, chattel, person, animal, or property. Furthermore, term "signal" is also construed broadly to include any electronic digital and/or analog pulse or other recognizable or coded waveform, as well as any digital bit stream or other processor-recognizable value, variable or data form.

For example, object may represent one or more member belonging to common or assigned family, classification, or other actual or virtual grouping or enterprise. It is further contemplated that objects 2 could include any moveable (e.g., pedestrian, vehicular, etc.) physical item, such as person, animal, vehicle, mobile fleet, containers, belongings, or other non-fixed chattel which may change location relative to one or more fixed locations, such as general transit paths or other typically non-moving sites (e.g., hallways, roads, railway, etc.), homes, offices, schools, hotel, hospitals, warehouses, stores, etc.).

Preferred integrated network monitoring system includes one or more central console controller or user processor 6 coupled to digital switch or other selectively accessible, packet and/or circuit-switched network communications infrastructure 8. Network 8 may be functional aggregate of multiple sub-networks including conventional or proprietary networking equipment for enabling access to and/or through the World Wide Web (WWW), or other functionally equivalent local and/or wide area network (LAN/WAN) interconnectivity.

Network 8 provides digital connection to or from any allocated web node address or equivalently accessible network resource, such as Uniform Resource Locator (URL), associated hypertext files, and other proper domain name and file location, according to Transmission Control Protocol/Internet Protocol (TCP/IP) addressing scheme and proper hypertext file transfer protocol (HTTP). In this way, networking is achieved via one or more network ports or other functionally equivalent servers and/or other conventional wired or wireless network access equipment (e.g., router, modem, hub, bridge, etc.) configured conventionally for transferring and/or transmitting data to/from and/or through the Internet. Such World Wide Web and Internet protocol and associated networking and remote access standards as are specified in published hard-copy or on-line documents are hereby incorporated by reference.

As used herein, term "proprietary" pertains to known privately-implemented digital networking techniques, equipment, or related electronics and software, however, configured at least in part according to non-standard manner and may still be standard compliant.

Controller 6 preferably is implemented for user monitoring of one or more objects 2 using conventional computer, workstation or functionally equivalent digital processing equipment and/or software. Contemplated examples of controller 6 functionality may include following, if configured to operate as specified herein: Network Computer-type product from Oracle, WebTV-type product from Microsoft, Pilot-type product from 3Com or substantially compatible network processor products thereto. Publicly accessible product functionality and interface specifications, including hard-copy or on-line published documents therefor, for such products are hereby incorporated by reference.

Controller 6 may include one or more standard digital microprocessor units, operating system software (e.g., Windows, NT, CE, etc.), digital storage devices and/or computer readable media (e.g., disk, memory, cache, etc.), output/input devices (e.g., keyboard, monitor, mouse, microphone, speaker, camera, etc.). Furthermore, controller 6 may include conventional network accessing interface firmware or circuit, such as Ethernet card, and remote processing or network access software such as a web browser (e.g., Netscape Navigator, Microsoft Explorer, etc.), preferably using conventional or proprietary text, graphics, and other media format, such as Hyper Text Markup Language (HTML), Extensible Markup Language (XML), JAVA, or streamed video or audio data format. In this configuration, real-time or stored remote and/or local access is achieved via the Internet or functionally equivalent enterprise or intranet network of object data to or from one or more target units 4, for example, in accordance with the present invention.

As shown, network 8 further couples to one or more conventional Internet, intranet or other LAN/WAN network connection or server 5 and sensor or detector 3, as well as communicator 7 for communicating, preferably through conventional or proprietary wireless connection, to one or more target unit 4. Note that server 5 may be any electronic hardware, firmware or software sufficient to couple detector 3 electrically and accessibly to network 8, and that detector 3 may provide substantially equivalent input functionality of sensor 44 of target unit 4. Preferably, electronic interface coupling between server 5 and network 8 provides for dynamic "hot-swap" interoperability, such that minimal network re-configuration and associated delay is required.

For example, server 5 may be provided as simplified electronic network device having conventional processor, embedded controller, or digital signal processor with real-time kernel or operating system, storage, Ethernet and/or modem facility, as well as electrical connectivity to detector 3 or other appliance, such as through Universal Serial Bus (USB), X-10, IEEE1394 (FireWire), or other conventional electrical signaling standard interface, which published specifications are hereby incorporated by reference. Hence, server 5 preferably includes uniquely identifiable IP address or subset packet addressing scheme associated therewith; and preferably more than one detector may be uniquely accessible, in parallel or multiplexed, by single server.

In this combined or integrated fixed and mobile network arrangement, controller 6, which in combination with network 8, communicator 7, as well as servers 5 and corresponding detectors 3 coupled thereto are located in relative fixed locations, and communicates with or effectively monitors through network 8. Preferably such arrangement uses conventional TCP/IP protocol Internet website addressing scheme, one or more fixed or movable object 2. This is performed by accessing real-time object data or other contextual information available or accessible via public or private IP address or other website associated with or supported by one or more detector 3-server 5 coupled pair. Detector-server coupling sites are disposed within detecting, viewing, or other physically proximate range relative to one or more specified object or set of objects 2.

In accordance with an important aspect of present invention, integrated network connectivity is planned such that one or more detectors or sensors 3 are installed at preferably fixed, although possibly slightly movable, physical sites or locations in deliberate and distributed fashion. As used herein, term "fixed" is understood to mean un-movably mounted, at certain physical location or limited area, although still relocatable to other fixed sites, and still adjustable or redirectable while at such fixed site, for example, to point at different direction or angular displacement. In comparison, term "mobile" is understood to mean movable or moving relative to such fixed sites.

Following are sample location categories or site classes: common public or private areas including carrier transit (transport stations, bus, train, plane, ship, taxi, emergency/transport vehicles, etc.), asset storage (warehouse, library, etc.), transport paths (roads, hallways, rivers, sidewalks, etc.), general human transaction sites (stores, schools, homes, hotel, hospitals, sports locations, mobile homes, parks, etc.).

Integrated network growth is planned according to actual or anticipated network communication traffic corresponding to particular coupled detector-server sites, sets or geographical clusters thereof, such that locations associated with higher density of objects and/or movement thereof are installed with additional monitoring detector/server facilities. Accordingly, integrated system database maintains and updates past, current and planned location for each sensor coupled to such system, preferably as function of time or schedule. Additionally, when existing detector and/or server site is relocated, corresponding database entries 162 are updated.

Detectors 3 may be single or multi-chip charged coupled device (CCD) and/or complementary metal oxide semiconductor (CMOS) digital imager or video capture devices, or other functionally equivalent monitoring apparatus for optically (e.g., black & white, color, infra-red, etc.) sensing and transmitting static and/or moving image signals. Preferably, detector 3 includes display indicator, such as light-emitting diode (LED), which indicates obviously to any nearby monitored person when such detector 3 is actively in monitoring mode, or other conventional display for indicating identity of monitoring party name, console source or location.

Furthermore, such detectors 3 may be implemented in non-imaging physical sensor manner, such as magnetic or smart card or reader, tactile finger-print sensor-type device, medical analog and/or digital instrumentation for measuring patient vitals and related records (e.g., pacemaker operation, temperature, blood pressure, mental activity, electrocardiogram, medication level, and other similarly monitorable information and signals).

Alternately in facility monitoring application, detectors 3 may be implemented to sense state and other measurement signals from motion detector, burglar alarm, door or window open/close detector, smoke detector, thermostat, phone answering machine, or other electrical home appliance. In certain instances, e.g., unauthorized home entry, such sensed state may trigger other functionality, such as taking electronic photograph and/or notifying certain entities. In this home application, such appliance may couple electrically to network 8 via server 5 or other functionally equivalent interface, for example, using standard electrical signaling interface such as USB, IEE1394 (FireWire), or so-called X-10 interface for communicating through standard electrical lines coupled thereto.

Optionally, detectors 3 may be coupled to control mechanism for adjusting detector operation, such as tilt, pan, focus, etc., as well as means for causing multiple neighboring detectors to observe and track common object or object set, thereby obtaining various comparative surveillance data. Further optionally, un-coupled or non-functional but obvious "decoy" detector/server sites may be installed at select locations to provide deterrent observation effect as well reduce network traffic and overall cost. However, hidden detector/server site may be provided to observe object activity proximate to decoy site.

In accordance with an important aspect of present invention, detectors 3 are accessible through the Internet, intranet, or other functionally equivalent networking connection. In this way, currently detected object data signal may be obtained therefrom. Any one or more user with proper access capability (e.g., computer with browser, Internet access, and proper authorizations) may observe or download such object data information, either in multi-cast mode (i.e., multiple observing controller users belonging to group, neighborhood or other common interest monitoring same detector or object or set thereof,) or point-to-point mode (i.e., single observing controller user monitoring one or more detector or object or set thereof). Data download may be delivered in JAVA applet format, preferably including search-able embedded pixel image or digital watermark, or otherwise authorized only to run on specified sites or processors. Preferably, each detector 3 couples continuously to provide digital data stream to Internet 8 generally through corresponding server 5 having identifiable IP address, packet identifier, or other network link to file or directory containing desired monitored object data.

Moreover, accessed object data or other contextual information may be obtained by one or more monitoring user controller 6 through network 8 and one or more conventional or proprietary wired or wireless communicator 7 coupled thereto for communicating with one or more target units 4 as well, preferably via public or private IP address or other website associated with or supported by one or more target unit 4 located physically with or proximately observable or detectable to one or more monitored object 2. In such distributed client-server configuration including communicator 7 and one or more target unit 4, it is optionally contemplated that functionality and operation of controller 6 and one or more target unit 4 may be functionally equivalent or redundant.

In accordance with an important aspect of present invention, one or more mobile target units 4 are provided to move with and observe an associated object 2. Target units 4 preferably are wireless communications devices which function also determine current object location and movement, as well as sensed or detected condition, image, sound, etc. Accordingly, target units 4 may couple wirelessly to at least one controller 6 through network 8, as wireless communication service 7 provides conventional or proprietary connectivity between the Internet and target units 4.

Hence, in this combined innovative architecture and methodology, the overall integrated system preferably includes a geographically or relatively fixed network of multiple detectors each uniquely accessible through Internet browsing interface, overlaid with a mobile set of target units 4 closely associated or attached to certain objects 2 for remote monitoring thereof. More accurate object monitoring is achieved by using multiple fixed detectors, especially in conjunction with mobile object detection, motion surveillance, processing, analysis, diagnosis and/or update reporting software provided therewith. Additionally, substantially improved and low-cost surveillance scaleability and accessibility is achieved by leveraging the Internet and/or various comparable networking infrastructure to provide wired and/or wireless connectivity.

Further, as described herein, control software 66, preferably including one or more modules described hereunder and provided in whole or in part in storage 49 for execution by processor 48 in target unit 4 and/or controller 6, to enable communications 161 between such fixed and mobile components, maintain object data status and mapping information 162, track and correlate movement activity from different sources 163, maintain system security and access 164, manage object-related electronic transactions 165, diagnose and analyze object performance, provide data reporting, and analyze visual object information 168.

Figure 4:
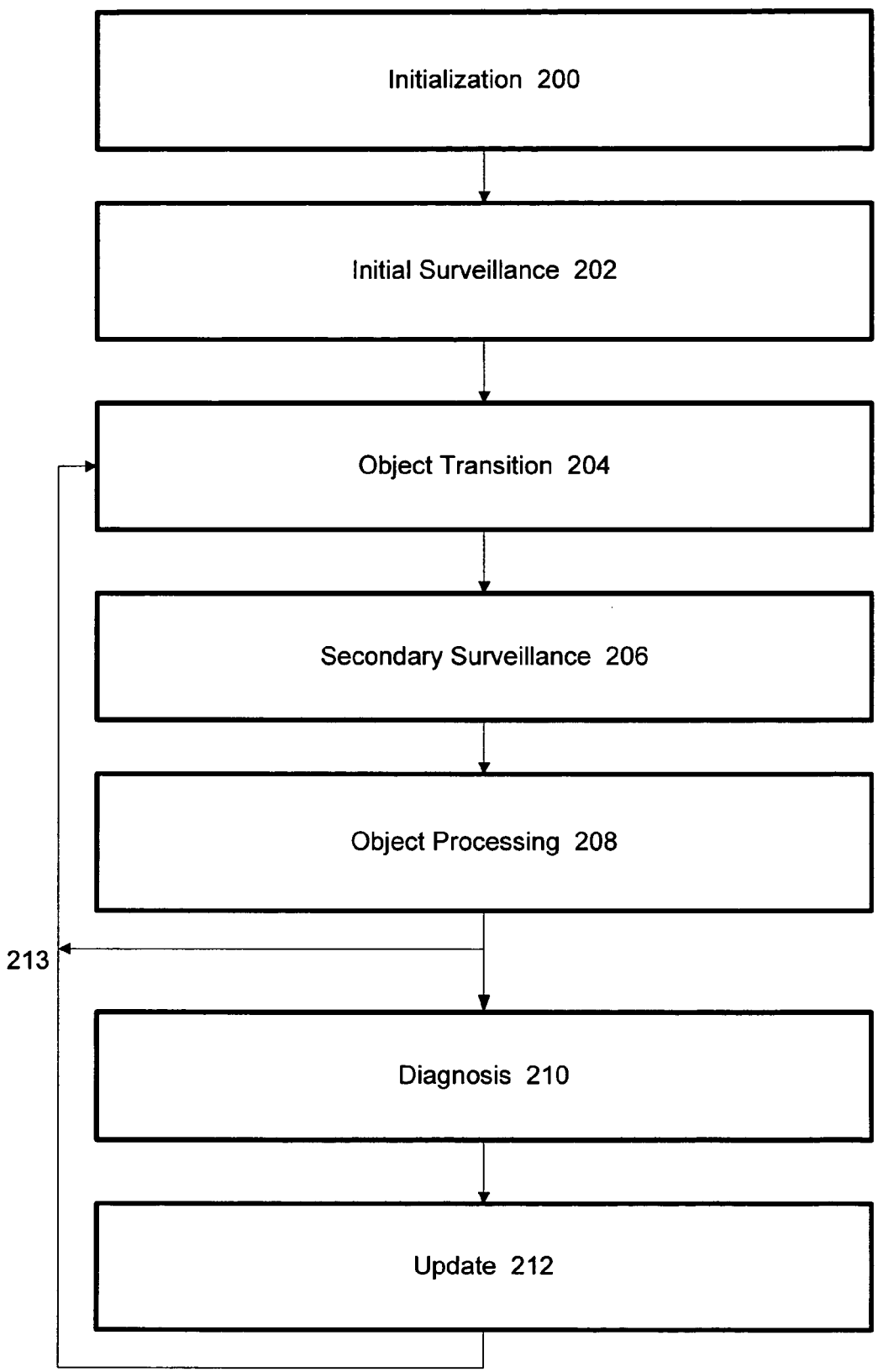
FIG. 4 is a flow chart of the general methodology of the integrated system for monitoring remote objects according to the present invention.

Target units 4, shown in FIG. 4 block diagram, are disposed for relative object 2 communications, tracking and monitoring at various fixed or movable locations in selected topology or geography preferably in anticipated or known paths of object 2 movement relative to fixed location of controller 6, network 8, communicator, server 5, or detector 3. Target unit 4 may include sensor unit 44, communicator unit 46, and locator unit 42, as well as portable power source (not shown) preferably including low-power indicator. Preferably, target unit 4 uses non-volatile memory such that digital stored data is not erased during power outage.

Sensor unit 44 may include one or more video cameras, active sensor, infra-red detector, microphone, or other optical, medical, or otherwise physical monitoring or observation device to provide real-time object data, such as audio and/or video signals, or other electronically detectable frequency signal, such as infra-red, or other analog or digital electrical signal sensed from monitored object 2 depending on nature of object and kind of monitoring desired. Preferably, target unit 4 input sensor 44 processes authenticated voice pattern for proper recognition and/or dialing of user instructions or other language syntax, but one or more microphone audio functionality may be user-selectively de-activated for privacy or activated continuously for detection and recording.

Communicator unit 46 is coupled to sensor unit 44 to send and/or receive real-time or store-and-forwarded object data or packets preferably generated by sensor 44. Processor 48 and memory 49, including preferably operating system and web browser software, are also provided optionally to enable access and/or processing of data, such as real-time object data associated with predetermined website, IP address, or so-called Internet website hot-link or URL, as received from sensor 44 and accessible via any corresponding server equipment coupled thereto.

In such self-contained processing configuration, controller 6 may conduct real-time viewing or analysis of object data. Processor 48 is programmable to monitor one or more pre-configured website, i.e., corresponding to IP address for particular object 2 observable or proximate at certain event or time window, for site hits thereto, or user modification requests to change object observation or processing as desired to provide remote object access and modification thereof.

In one embodiment, processor 48 monitors observed input to sensor 44 for new object data and provides such data to pre-configured webpage site. Controller 6 accesses and views such object data at corresponding site address or URL via Internet browser tool. User instructions and/or modifications thereto can be conveyed to target unit 4, for example, to change, select, or adjust particular sensors 44, such as camera focus, zoom, tilt, angle, pan, etc., or other such operational attribute of sensor device 44 of target unit 4.

Additionally, controller user may provide input to specify or request current or future monitoring or surveillance of one or more certain location (i.e., associated fixed detector site) or object (i.e., associated mobile target unit site). In this manner, software 66 is configured or updated via database records, object movement and observation rules, object, target unit or controller communications therewith, as well as any related transaction, diagnosis, reporting and security considerations appropriate to include, for recognizing or searching one or more object, or contextual observations at detector sites or object directories associated therewith.

Variety of remote object surveillance applications are contemplated, such with multiple sensors 44 using video cameras situated at regular intervals or high-traffic locations at remote sites to observe multiple or moving objects.

In case of health care applications, such as remote medical patient monitoring, sensor 44 may include one or more medical instrumentation for observing or attachable to patient. Target tracking unit 4 preferably includes communicator unit 46 configured such that processor communicates medical and/or tracking data and other data about monitored object to professional medical or other care-giver disposed at controller 6 via communicator 7 and network 8.

In embodiment where object 2 is moveable and target unit 4 is attached to or moves correspondingly or portably with object 2, target unit 4 includes locator unit 46. Locator 46 preferably is implemented using general navigational functionality such as radio triangulation functionality relative to local radio signal sources, or GPS receiver relative to satellite signaling sources, for determining location of target unit 4, and thus correspondingly of moveable object 2 physically associated therewith. GPS receiver functions according to standard international telecommunications protocol in functional cooperation with orbiting satellite signals to calculate positional vectors, which standards are hereby incorporated by reference.

In this embodiment of target 4, locator 42 couples to communicator 46, which preferably include digital wireless transceiver, such as conventional or proprietary cellular phone-type radio connectivity to associated radio base station representing communicator 7 coupled to network 8. Hence, object 2 observation and position data from target unit 4 is accessible by controller 6 via network 8 and communicator 7.

In particular, communicator 7 wireless radio communication functionality may be provided through conventional base station, network hub or functionally equivalent network or communications equipment of cellular phone, trunked radio, wireless local loop, and/or Internet data service provider. Air interface between communicators 7, 46 may comply with standard radio protocol (e.g., TDMA, CDMA, GSM, CDPD, IMT-2000, etc.), which standard documents published on-line or hard-copy are hereby incorporated by reference.

For example, cellular phone or pager functionality in communicator 46 in target unit 4 may transmit navigational or position signal provided by locator functionality 42 to communicator 7 during conventional cellular or pager roaming or signaling protocol with local radio base station or cell site to report current call or phone status or location. In this regard, wireless communication service and Internet service provider could be substantially same entity. Controller 6 thus receives object and object position data via network 8 and/or via servers 5.

Optionally, accelerometer functionality is included in locator 42 to indicate object acceleration in various direction (e.g., x, y, z directional axes), particularly actual time and relative direction of such object movement during start or stop events. Preferably, accelerometer signal or data indication of active or relative movement serves to trigger more accurate object position calculation, e.g., supplemental to and compared with other navigational measurement such as GPS position calculation for object at certain time to verify correct or more accurate object location. Preferably, accelerometer measurements are initially calibrated more accurately to coordinate with such other navigational schema.

Preferably target unit 4 is physically compact and/or rugged portable device, appropriate for hand-held use or mounting on instrumentation or in vehicle or automobile dashboard, and includes text multi-media, and/or graphic display output and associated drivers 43. Internet browser software may be provided therein to allow user remote communication and data access to other applications and databases via the Internet. Input functionality is provided for sensor 44, including possibly keypad, touch-screen, electrical signal port, etc. depending on application of target unit 4, such as hand-held use, or coupling to medical instrumentation.

As described above, target unit 4 may include processor 48 and storage 49, as well as communication device 46 having one or more operational modes, such as cellular phone, email, browser, fax, and/or 2-way pager. Storage 49 may be implemented using digital video disk (DVD), so-called smart card format storage, or other conventional or proprietary storage or memory device.

Figure 3:
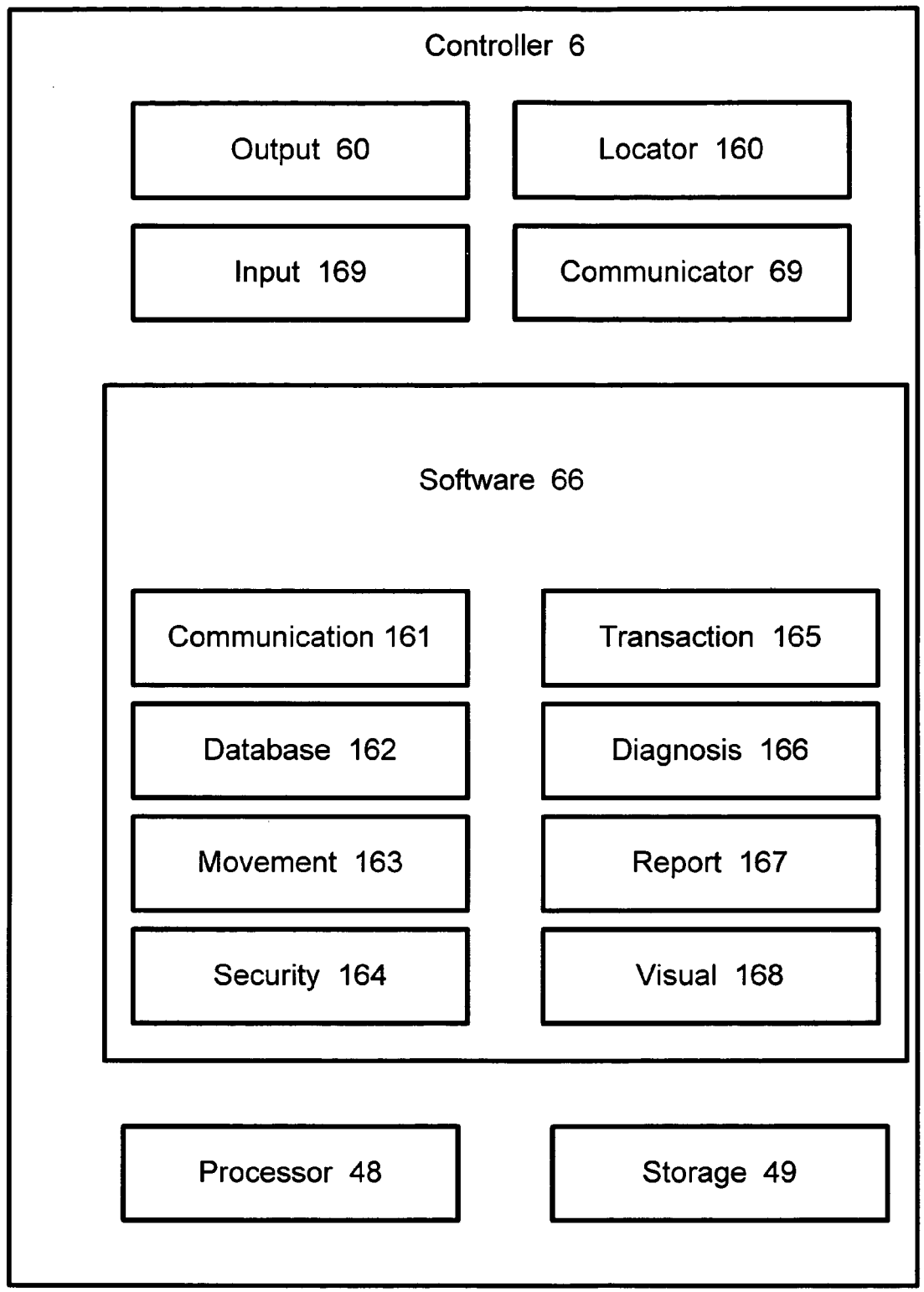
FIG. 3 is a more detailed block diagram of controller 6 of FIG. 1 provided according to the present invention.

FIG. 3 shows block diagram of controller 6. Preferably, controller 6 is implemented in personal or portable computer or other conventional processing platform including output device and drivers 60 (e.g., display monitor, speaker, 3-dimensional virtual reality (VR) and/or holographic display, etc.), input device and drivers 169 (e.g., touchscreen, keyboard, buttons, mouse, microphone, camera, etc.), microprocessor 48, and storage 49. Storage 49 may be implemented using digital video disk (DVD), so-called smart card format, or other conventional storage or digital memory device.

Additionally software 66 therein includes operating system such as preferably Microsoft Windows or other conventional operating system, Internet browser software for accessing and communicating with world-wide web URL sites, as well as innovative instruction code and any related firmware or circuitry/equipment for analyzing and/or processing data according to preferred embodiment one or more of following functional modules, as described further herein: network and data communications 161, object and map database structure 161, object movement processing 163, security management 164, electronic transaction processing 165, diagnosis and/or corrective tool 166, performance report updater 167, and visual object analyzer 168.

Such modules are generally user customizable and adaptable according to particular need for object surveillance. Further, such modules may be combined into common seamless programs or partitioned into multiple distinct cooperating program components. Moreover, such modules reside actually, in whole or in part, in controller 6, associated storage peripheral device, or other processing machine or other such controller coupled thereto or accessible through network 6. Additionally, to improve program performance, one or more of such modules may be omitted or uninstalled from controller. Furthermore, modules in software 66 may be provided in layered or hierarchical arrangement. In this manner, low-level core functionality is provided by database structure 162, object movement module 163, visual analysis module 168 and object diagnosis tool 166, and next-level functionality is provided by security module 164, communication module 161, transaction module 165, and report module 167.

Preferably, browser software functions according to commercially available browser product such as, e.g., Netscape Navigator or Microsoft Explorer, or any other functionally equivalent means for accessing Internet, intranet or other conventional or proprietary LAN/WAN website, network node or IP address.

Controller 6 or other user selection and viewing of desired objects 2 to be monitored are facilitated by invoking or clicking on one or more websites, address or corresponding graphical hot-link icons provided or updated by target unit 4. Controller 6 access to one or more objects 2 may be provided indirectly through intermediate or topical website or particular page associated with one or more objects 2, associated location, object grouping, or other related object attribute for locating, searching, or otherwise monitoring certain select object(s) 2.

Optionally, database structure 162 in software 66 of at least one controller 6 provided in integrated system includes network searchable (e.g., having IP-addressable sites, links, address subsets thereof, or other deterministic network access scheme) listing or set of controllers and associated users, target units and associated objects, detectors and associated servers. Preferably database structure is provided asynchronous storage device array format to reduce access delay thereto, including any object or set thereof description, associated movement, schedule, timing, observable images, non-image conditions, states, fees, etc. In this way, preferably Internet search ability of particular object or object set as well as monitored information such as multi-media images thereof are achieved, assuming proper authorizations apply as described herein.

Database structure 162 may include schedule or other temporal scheme associated with one or more object presence, movement and/or other observed condition in one or more monitored locations. In this way, control software 66 or user thereof may compare determined object presence or other surveillance measurement thereof against such scheduled object activity. This allows determination of compliance, as well as recording or alerting appropriately, for example, when object delivery is late, early, on schedule, unscheduled, or absent. Furthermore, by determining actual monitored object schedule, control software 66 may provide for more efficient local resource allocation and coordination with such monitored object or set thereof.

Additionally, software 66 may employ one or more intelligent software agents to function in conjunction with database 162, communications module 161, transaction module 165, or movement module 163, as well as other modules included therein. In this manner, for example, upon connecting controller 6 and/or mobile unit 4 to Internet 8, one or more such agents may act on behalf of such controller 6, mobile unit 4, or associated object 2.

In particular, such software agent(s) effectively extend functional reach of various module functionality in software 66, such as by: negotiating with other software agents over network server connections with one or more fixed detector or server sites and/or mobile target units to schedule monitoring, collaborative chat or meeting times; or coordinating timely delivery of product, services, or other electronic data or signaling.

Additionally, such agents may serve to retrieve (i.e., "pull" or seek specific information such as certain objects or medical patients or their locations, movement patterns, schedule, or other monitorable attributes), watch or "push" for specific information (e.g., appropriate medical treatment or medication, target banner advertisements or other commercial message or reports aligned with known or expected interests of particular mobile objects), provide integrated system utility help and diagnostics, or shop or prescribe for fixed products or services according to object user preference.

In this way, proper timely delivery of hazardous or perishable mobile objects, for instance, may be ensured, preferably using controller system, target unit 4, or GPS receiver generated clock for providing accurate synchronizing timing signal, and thereby minimizing possible network signaling latency.

Visual and/or object movement data from sensor 44 includes symbolic or graphical representation of one or more monitored object 2. Such representation may include predefined or customizable avatar symbol or reduced thumbnail format, as well as relative location of each detector presented in topological map overlay, including positional or temporal textual or symbolic tags or identifiers associated with particular objects or detectors proximate thereto. For example, current mobile unit 4 and/or associated object 2 location relative to designated home or base location may be illustrated against map.

Associated graphical and any corresponding textual map data may include digitized cartographic, street, building, room, layout, elevation, depth, or other multi-dimensional map data. For example, monitored person object may be illustrated as having entered building at particular time. Preferably, current or updated map data, including any associated directions, commute traffic or parking data, are downloadable from controller 6 or other central map data source to one or more mobile target unit 4 for use therein.

Preferably, input 169 is implemented using selection entry interface functions, such as on-screen buttons for indicating user preferences or text entry in response to various queries from operational control software 66. Control or performance report 167 functions to generate personalized or standard on-screen, hard-copy print-out, file storage or transfer, or other manner for delivering analytical, diagnostic, statistical, historical, predictive, probabilistic, or other formatted text or graphical report relating to object monitoring operations of overall integrated system managed by controller 6.

Similarly to mobile target unit 4, controller 6 includes detector or other physical or vital medical sensor interface 169, location-determining device 160, such as GPS receiver, local radio signal triangulation functionality, or accelerometer device for generating actual or relative positional signal, and communications device 69, such as conventional cellular phone or pager functionality.

Additionally, such communications functions 69, 46 may include portable local number, universal identity module, or other identifiable value(s) for communicating with particular authorized or associated user. Such local portable number(s), including any prepayment credit value, may be stored on smart card or functionally equivalent portable device which is readable electronically by controller 6 or target unit 4.

Preferably, communications module 161 functions adaptively to initiate, establish, modify, and coordinate user communication or messaging involving text, voice, video, image, or other electronic synchronous or asynchronous signaling between controller 6 and mobile target unit 4, as well as any other processor or peripheral coupled to network 8. Hence, polling of available objects, detectors, controllers or other networked resource in integrated system, as well as providing recognized or unrecognized voice or video over data channel, signaling or network operation are schema contemplated within the scope of preferred implementation.

Additionally, communications module 161 may serve adaptively to enable scaleable collaborative or group chat communication between authorized multiple entities 4,6 coupled thereto. This configuration may arise in multi-cast mode wherein multiple observers monitor common object movement activity. Also, upon detection of emergency or other urgent messages (e.g., 911 phone calls from target unit cell phones), relevant object location, movement, or other conditions are communicated or forwarded immediately. Such messaging may be treated as high-priority to appropriate authorities located proximately to monitored object in distress.

Object and map database structure 162 functions to determine and store each monitored object representation, as well as prior, current and likely future locations, for example, as provided from initialization values, fixed detector site measurement or other observation signals, mobile sensor measurement or other observation signals, console or mobile unit user entry, as well as processor calculated, estimated or projected values. Such database information is useful for subsequent read, write, modify, delete, restrict, or other data access operation.

Data structure may be implemented in one or more constituent data structures, such as various object-oriented and/or relational data tables. Preferably, stored object data is maintained in dynamically or simultaneously accessible and updatable database format such that multiple object and object related information (e.g., movement, condition, billing, etc.) may be read and processed by more than one object processing instance or process.

For example, monitored object data format may be provided including any of the following values: object name, unique object instance or identifier, object group or association, object interests or requests, object physical or medical condition, object financial status, initial location and time, subsequent locations and times, system flags or other error indications associated with object, object mobile unit identifier, object digital image, video and/or audio information which may be pre-recorded or delivered from current "live" broadcast or transmission.

Additionally, database 162 maintains associated map databases such that object locations may be overlaid thereon as appropriate to show position and movement. For example, office or residential facility floorspace, rooms or locations are mapped to illustrate relative object movement therein. In particular, movement processing module 163 functions programmably to track object positions and recognize positional variances indicating relative movement, including horizontal, lateral, as well as vertical movements. Preferably, set of monitoring rules or parameters apply to restrict or expand object surveillance scope, such as specifying various allowed schedules, locations, any monitoring or metered fee charges, monitorable objects, as well as limiting particular data types, such as video or audio only, or restricting access to certain sensitive medical, financial, or other private observable object condition or state.

Movement processing module 163 determines when certain object(s) 2 being monitored by particular detector(s) has moved or otherwise likely to roam according to determined actual movement vector of such object into new detection area, unmonitored area, or overlapping area associated with different detector. In this manner, control software 66 may recognize object movement using module 163, and thereby process 208 object movement information to provide proper determination 210 and any appropriate post-processing thereof. For example, roaming object or object set may be handed-off to neighboring or next closest or available detector-server site, or potentially colliding object vectors may be so detected and thereby avoided in time.

In accordance with an important aspect of present invention, fixed imaging array of detector sites operationally integrate with locatable mobile units. Fixed and mobile components communicate preferably through Internet protocol and equipment. Such integrated system enable flexibly scaleable approach to monitoring object movement therein.

To achieve effective integration, movement module 163 and database 162 preferably cooperate functionally to designate one or more object for tracking. Initially, each tracked object is statically represented in database with unique object identifier, start location, monitoring time at such location, as well as other measurable object conditions, such as direction vector, height, etc. For each tracked object, module 163 determines whether such object has associated target mobile unit 4 and/or detector server site within range to observe such object. Mobile unit 4 may be registered in database 162 to indicate association with particular object. Object initial location (e.g., Cartesian coordinates) may be compared against current list in database 162 of functional detector server sites determined to be electronically accessible to Internet and physically located within range to observe object.

Continuous or dynamic streaming information about particular object(s) may be obtained as well, for example, in live video or audio feeds. Object designation may be invoked by user request to locate particular object or set of objects. Initial values may be user-specified, derived from pre-defined object movement schedule, or actually determined from integrated system field measurements (i.e., mobile unit or detector sites). Accurate timings may be generated from or synchronized with global clock signal available from GPS receivers.

Then, after certain time interval elapsed from initial object monitoring event, next object monitoring event occurs. Subsequent object surveillance sessions may occur according to random, regular, intermittent, or otherwise scheduled or triggered times (e.g., by mobile accelerometer or fixed motion detector activates in response to object movement). Also, sessions may be repeated to provide iterative calculations of more refined and accurate measurements of object movement, for example, using smaller time intervals.

So, during next event to monitor tracked objects, new measurements are obtained from any associated target mobile unit 4 and/or detector server sites within observation range. Preferably, substantially during such monitoring event or period, mobile unit 4 provides GPS location information associated with tracked object, while observing detectors deliver one or more image of tracked object. Such integrated approach provides corroborated surveillance, i.e., that target object is evidently observed to be located at certain location at particular time.

Hence, during normal integrated system operation, mobile tracked object activity traveling from one observation area to another area may serve to trigger and cause movement module 163 to activate such neighboring fixed detector server sites. In another case, console user merely requests to know which objects are presently in an observable area (i.e., query: who are all here?). In such case, fixed observation data may serve user to trigger and cause one or more mobile units disposed in such area to submit their information (e.g., associated object identifier, location, time, etc.) As appropriate, database 162 is updated when certain observation detector or sensor sites are triggered to monitor.

To increase degree of remote surveillance further, other detector also within observing range, but having different viewing angle, zoom, lighting, etc., may be caused to monitor target object. Other sensors in associated mobile unit may also be caused to monitor target object in additional ways, e.g., by activating medical instrumentation to take patient vital measurements. Orchestration of fixed and mobile observation measurements upon tracked object may be specified on case-by-case basis depending on surveillance application.

For example, system flag may be issued or displayed when tracked object is determined to be absent from scheduled location monitored by certain detector at scheduled time. Additionally, error may be indicated when same object identifier is determined to be detected at multiple different observation sites, but at substantially same time (since this condition may suggest fraudulent or pirated object or associated mobile unit). Furthermore, urgent notice may be delivered to console when emergency is signaled from object through fixed or mobile observation channels.

Preferably, movement module 163 continues operating to determine and update tracked object location and times, even when one or more observation values from various fixed or mobile detector, sensor, or locator functionalities are temporarily disengaged or inaccessible. During such down periods, movement module 163 may use last stored information about particular tracked objects available in database 162, or provide extrapolated or predicted object location at future times based on schedule or most recent movement extrapolation (e.g., according to object direction, speed, etc.).

Security and access processing module 164 functions programmably or adaptively to limit, encrypt (e.g., using public or private key encryption scheme), or secure user access to system, particularly database 162. In this way, individuals seeking to monitor certain objects, for example, may be pre-authorized and/or authenticated using one or more digital certificate. Such digital certificate may include person name, address, bank brand, timestamp, public key, and is cashed and signed by issuer digital signature. This screening method may apply to health-insured or multi-cast designated member observers or excluding un-insured or under-aged children or other vulnerable or unqualified group or objects from pre-specified monitoring or commerce transaction activity.

Security access criteria for program rating and screening may comply with federally or privately published standards for so-called V-chip technology, which are hereby incorporated by reference. In special or emergency circumstances, security to object database and recorded and/or actual object surveillance and movement data may be over-ridden (i.e., trap door) to provide access to general or specific object information.

Security and access module 164 may determine or recognize authorized, preferably according to location-based and/or associated object movement constraints, controller user or mobile object seeking to communicate with integrated system through authenticated sensor or input via acceptable voice pattern, finger-print pattern, handwritten signature, magnetic or smart card signal, etc. For example, module 164 records and issues alert when intruder target unit 4 is determined or appears to be monitoring object 2, based on geographically correlated object/target unit 4 movement provided to console 6, i.e., although unauthorized to do so.

Additionally, access to certain detectors or corresponding sites where current or historical access activity is relatively high, or results in noticeable network congestion, may be limited. Purpose here is to provide dynamic load balancing, whereby network usage is collected, measured, analyzed, and re-allocated to different available networking and detection resources.

Fraud detection feature may be included to identify, record and alert against unauthorized user, input pattern, or other predictable or unrecognizable signature or electronic behavior. Integrated system attempted and/or successful access thereto via network ports, servers, or other access connections are logged and traceable, preferably by general or specific geographic location. Furthermore, object monitoring services are preferably restricted according to specified rules, as described herein, including authorized observers, times, locations, objects, etc. Preferably, module 164 employs conventional network firewall protection.

Transaction processing module 165 functions preferably during object processing and/or diagnosis to manage user, advertiser, vendor service billing, or other commercial transactions using integrated system. For example, transaction processing module 165 may initiate, activate, update, combine, separate, terminate or otherwise process user accounts associated with one or more user controller 6 or monitored objects 2, or measure and/or restrict actual object 2 or controller 6 usage or monitoring time, range, location or scope. This is achieved preferably selectively according to specified billing or pricing schedule, or other rate scheme to provide regulated user charges on credit or corporate accounts as well as location-based and temporal-based charges. Transaction processing module 165 interacts through textual, graphical, sound, and/or video interface with user through appropriate input and/or output functionality of controller 6, and/or object 2 through target unit 4.

Moreover, transaction processing module 165 may record and analyze actual past or current, or potential future market demand, wants or needs according to user (user controller and/or object set) demographics, geographic location, movement pattern, preferences, consumption, transaction, or other commercial activity, behavior or information, particularly arising from object monitoring using integrated system. Hence, important objective is to provide customer-centric electronic transaction scheme.

Optionally, transaction processing module 165 in cooperation with one or more other modules in control software suite 66, provides real-time, dynamic, targeted and/or selective notification, delivery, advertising, educational, pricing, inventory quantity, and/or other business sales, distribution or marketing interactive or static text, graphics, voice, and/or video data information and/or associated electronic signaling pertaining to one or more commercially available or soon-to-be-available product and/or service.

It is contemplated further that such solicited or unsolicited product (e.g., text document, such as books, news, sports, or stock report; graphics, such as greeting card, or other artwork; data, such as research databases, person or item listing, or other electronic file transfers; sound, such as live or recorded voice or instrumental music or newsbroadcast); or service (e.g., professional services, electronic tool access, commercial transactions, etc.) may be delivered electronically. Such delivery could be through on-line Internet distribution, publishing or access otherwise via Network 8 to user controller 6 or object 2, as monitored according to present invention.

Furthermore, in such operational mode, transaction processing module 165 may depend on known (e.g., based on reported or requested consumer want or need data) and/or expected (e.g., based on demographic, social, or other relational group behavior and/or predicted, extrapolated or adaptively calculated consumption pattern thereof) interest of one or more object 2 or user controller 6, within certain observable or monitorable group or surveillance location or region. This applies particularly in shopping, initiating, bidding, negotiating, accepting, modifying, or completing one or more commercial or private transaction, initiates or offers (i.e., unsolicitedly "pushes") commercial information to one or more potential buyer controller 6 or object 2; or responds or replies (i.e., solicitedly "pulls") by delivering commercial information to one or more potential buyer controller 6 or object 2, or by responding appropriately thereto (e.g., auction bid, acceptance of offer, counter-offer, request for more product or service information, etc.).

Hence, in accordance with one aspect of the present invention, improved electronic commercial transaction methodology is provided generally such that one or more potential buyers and one or more potential sellers (i.e., wherein any buyer or seller may correspond to user controller or target unit object having certain observable or monitorable attributes, as described herein) communicate digitally through Internet or other substantially equivalent networking facilities.

In particular, such integrated system for enabling remote object surveillance-based commercial transaction is preferably achieved by considering potential buyer or object movement relative to fixed or mobile resources (i.e., products or services), thereby optimizing localized consumer satisfaction. For example, using integrated system, mobile "yellow pages" or other local vendor or available product listing, possibly provided in local mobile or fixed "kiosk" transaction station for obtaining certain commercial data, or actually completing transaction, improves likelihood of matching mobile consumer wants or needs with nearby product or service resources. In this manner, module 165 may only bill customer for actual usage time or benefit derived.

Diagnosis and/or corrective-action tool 166 functions generally to obtain and analyze integrated system status as well as object monitored data, particularly prior, current, and predicted object position, movement, image, as well as other physically sensed information. At any time, tool 166 may conduct network configuration and connection test to "ping" or otherwise sense state, condition, status, location, of one or more controller, detector, server, target unit, or object otherwise connected thereto.

Tool 166 may adaptively provide positional or directional functionality generally to alert authorities or other interested parties when undesirable object or movement is monitored. Examples may include: when associated child, wheelchair, hiker, golfer, luggage or other vulnerable or valuable person/item object is recognized to be located, having moved, or imminently expected to move outside familiar or safe locations; or when associated delivery, transport, or emergency or other service vehicle object is recognized to be located, having moved, or imminently expected to move outside proper or more efficient street trajectory, path or other preferred route.

Optionally, diagnosis tool 166 may programmably simulate expected object behavior. Simulation may logically, functionally or behaviorally model movement, or other monitored activity, based on interpolated values between actual detected values, or extrapolating further movement in time, for example, according to actual historical detected values of object movement. In this manner, diagnosis tool 166 may include one or more simulation models of certain object or object sets 2 using monitored object data from fixed and/or mobile detection sources. Depending on simulated or predictive object behavior, controller may recommend or take corrective action.

Additionally, in medical diagnosis context, it is contemplated that integrated system may be employed locally or remotely by qualified medical professionals to monitor and diagnose patient vital conditions from monitored signals using sensor detector 44 in mobile unit 4 coupled to controller 6 through network 8. For example, emergency medical data such as severity, timing, etc. may be relayed directly from mobile target unit 4 at crash site or ambulance to hospital emergency facilities.

Moreover, in commercial transaction or direct marketing context, it is contemplated that integrated system may be employed locally and/or remotely to conduct object movement-based or other monitored attribute-based targeted product or service advertisement, offer, counter-offer, acceptance, or other communication between buyer and seller. Advertisement may be invoked electronically for on-line viewing in banner display format, preferably targeted according to known or expected object or user demographics, behavior, or request.

Hence, when object 2 is associated with customer of certain product or service provided by controller 6 user associated with vendor thereof, integrated system is appropriate for providing improved services. Such services may include customer interaction, communication, tracking and support, for example with respect to automobiles, to notify regularly scheduled times for car repair service or part replacement such as battery of object car product, or detect unscheduled object activity or monitored conditions, such as electronic signal indication of flat tires, discharged emergency air bag, vehicle accident, empty fuel gauge, exceeding certain speed limit, stolen vehicle operation (e.g., hot-wired ignition), etc.

Performance report module 167 serves programmably to define, format, and generate requested, personalized, predefined or other useful textual and/or graphical information corresponding with operational attributes and statistics of integrated system operation. For example, as scheduled or requested, reports are provided regarding excessive object presence or movement within particular area, object movement update with respect to one or more monitored patient condition, residential or commercial facilities and grounds, vehicle or transit paths condition, goods production or inventory, etc. Hence, to improve inventory management, module 167 may provide report detailing status and capacity for drop shipments, just-in-time inventory, from-stock inventory, etc.

Data reporting may provide real-time delivery of current object location and movement relative graphically to 2 or 3 dimensional map overlaid thereon. Object imaging and locations from detector servers and/or sensor measurements and locations may be displayed on console screen as well. Emergency, error, or other system flags may be indicated.

Visual analyzer module 168 is optional and functions programmably to process, preferably in multi-dimensions, digital image or video information to attempt to recognize, store, compare, or otherwise process visually observed information regarding monitored objects. Module 168 preferably serves to detect object movement or activity within monitoring scope of certain detector sites. This may be achieved at certain times by comparing or correlating observable similarities or differences between initial and subsequent surveillance data therefrom. For example, module 168 may serve object image queries and attempt to recognize, retrieve from image database, or otherwise capture image of person or object associated with target unit 4 determined recently to have entered detector observation scope, or interacted with mobile target unit 4 sensor 44 or fixed detector 4 by communicating therewith through voice message, e-mail, facsimile transmission, smart-card or key entry, finger-print tactile sensing, etc.

In FIG. 4, flow-chart shows operational steps, including initial setup 200 of integrated system configuration (e.g., coupling controller(s), detector(s) and server(s) to Internet, providing identifiable network address for each coupled detector, target unit, controller, etc.). Additionally, initial setup may include database initialization, system ping test, detector polling and calibration, security access definitions or authorizations, permitted object monitoring rules, billing schedules, taxation rates, and object or map database definition, as specified adaptively herein for different object class, locations and/or times.

Preferably, network 8 connection by controller 6 to server 5 and detector 3, or to target unit 4 through communicator 7 is substantially continuous or dedicated, although may be established from time to time, for example, through conventional telephone dial-up modem, Integrated Services Digital Network (ISDN), digital subscriber Line (DSL), cable modem, 10Base-T, or other remote access procedure to or from Internet Service Provider (ISP) switch or router.

Optionally, to provide improved system reliability and fault tolerance, it is contemplated that integrated system may employ redundant, mirrored, or shadowed configuration employing identically maintained secondary controller, including equivalent object, detector, historical, current, predictive database, conditions and state. In this manner, when primary controller 6 somehow fails, or encounters substantial performance problems, secondary controller may be activated to provide fail-safe or uninterrupted object monitoring service.

Additionally, controller 6 may serve to reduce system congestion arising from many qualified users attempting to monitor the same object(s). This result may be achieved particularly by limiting total number of monitoring users from simultaneously accessing common website location representing certain object detector locations, or by providing distributed or shared access to common website location among multiple monitoring users, such as in multi-cast mode.

Preferred integrated system operation and methodology achieves improved remote object surveillance and movement tracking generally in an overlaid fixed and mobile networked infrastructure. Fixed network includes console units 6 connected via Internet 8 to multiple electronic detector units 3, disposed at strategic observation sites fixed about scheduled or possible paths wherein mobile objects 2 may traverse from time to time. In this fixed arrangement, object surveillance is achieved as console accesses servers 5 coupled to one or more corresponding detectors 3 to monitor objects 2 within observable range.

In particular, software 66 specified herein includes visual module 168 and movement module 163 which may provide certain object recognition and movement tracking thereof, such that when particular object moves, for example, from one observation area to neighboring area, console monitoring switches from one detector to another detector having improved observation position. Additionally, in case of object movement over relatively longer distances, module 163 serves to track object progress, as well as various object condition changes, such as fuel level, health condition, cash reserves, etc.

In significant part of preferred methodology, object movement monitoring is achieved by conducting initial surveillance of object set. Then, object is allowed time or opportunity to move, and follow-on surveillance of such object set is conducted. Database including object status and detected movement thereof provides accessible archive to determine object movement for subsequent processing. Fixed system, however, may provide limited object surveillance and particularly movement capability, depending on effectiveness of moving object recognition. Preferably, module 168 determines empirically likelihood indication of correct/incorrect object recognition, for example, depending on historical matching database of prior similar objects and/or conditions.

Accordingly, in part to provide improved object movement determination, mobile system is overlaid upon such fixed system. In this way, each tracked object 2 is physically accompanied by target unit 4, which includes accurate location-determination facility, sensor apparatus for observing object 2, and wireless communication transceiver for linking to network 8 and controller 6 through fixed communicator 7 coupled thereto. In this mobile subsystem overlay, remote object surveillance and movement are significantly enhanced by allowing console 6 to determine more definitively from target unit 4 identity, location, and other physically measurable condition of associated object 2.

More particularly, in accordance with an important aspect of the present invention, console 6 may coordinate remote observation activity at targeted sites. Coordination is done by selecting more accurately proximate detector-server nodes to track mobile objects 2 according to corresponding object location delivered by associated target unit 4 to console 6. Hence, in integrated fashion, console user leverages existing global Internet connectivity as well as geographically distributed detector and server set coupled thereto. Also, wireless mobile flexibility is provided by properly equipped target units attached or included physically with certain monitored objects.

Firstly, based on various initializing factors for determining object location or surveillance, such as initial polling results from one or more target units 4 or detectors 3, retrieved object site information, object movement search results, or initial, preferably authorized, detected observations or other monitoring surveillance 202 performed on subject object(s), initial positioning or surveillance for one or more object may be determined. Such initial information may be displayed graphically preferably relative to corresponding map data, based on electronically observed measurements, data, signals, or pre-defined object context or related values, relative to map database or other comparable contextual database.

Monitored object set may also be defined according to user-requested search terms for finding and/or prioritizing relevance of specific or qualified object members of particular class or other searchable attribute, e.g., find all doctors in "94062" zip code area, or find "Elsa" the dog (who may be wearing a trackable target unit on dog collar). According to preferred methodology, object monitoring may be invoked by causing controller browser to initiate session call for accessing website address associated with server-detector associated with particular object.

Preferably, database 162 maintains one or more object representation, instance, state, condition, movement, and/or other associated monitored information, such that at any particular moment, multiple objects 2 may be monitored and processed effectively in parallel according to operational steps of FIG. 4.

Monitored object set may be assigned expected time, location, or other physical conditions, such as medical state, each assigned value or substantially similar value within allowable range, say +/−15% variation. In this case, initial values or conditions may be set in integrated system, such that proper values are monitored accordingly, for instance, activating video detector(s) located most closely to particular monitored object.

Next, object movement or transition may occur 204 after or during a specified time period, which may be regular, random, triggered, or pre-scheduled. During such temporal period, object physical state, such as location, vehicle, luggage, patient, nanny, bank teller, vehicle traffic, or prisoner condition may change. As appropriate, GPS receiver in mobile unit 4 may provide universal clock signal source for relatively accurate synchronization within integrated system.

Then, based on secondary authorized and detected observations or monitoring surveillance 206 performed on subject object, or secondary polling results therefrom, secondary position or condition is determined. Preferably, integrated network configuration determination or ping test upon one or more associated controller, server, detector, or object coupled thereto is conducted to recognize current network participants and corresponding configuration, conditions or states. Hence, when such testing reveals defective or unresponsive detector or server site, then such site is deactivated and removed from active database, until problem is resolved.

In accordance with an important aspect of present invention, integrated approach combining positional data (e.g., processed GPS or other triangulated radio signals) and visual data (e.g., observed real-time video or other digital image), or other physical sensory data (e.g., patient medical vitals) are obtained. Such data are obtainable by set of fixed or relatively fixed (e.g., video cameras) or mobile (e.g., GPS receivers) disposed at various locations about monitored object presence and activities. Such integrated network of sensory and positional detectors may be arranged along streets, highways, bridges, intersections, elevators, buildings, restrooms, classrooms, hotel, offices, hospitals, prisons, storage warehouses, churches, stores, and virtually any other practical location of monitorable human or animal activity.

To address potential individual privacy sensitivity or objection to being monitored, certain locations may be omitted from detection, or require approval prior to or while being monitored. Additionally, monitored object(s) may be provided current list of monitoring user source names, class or total number.

Next, object analysis and movement processing is performed and/or graphically displayed 208. Here, relative movement, acceleration or other object physical condition shift or other detected transformation is accomplished when spatial or other physical variance between temporally spaced measurements is detected and accordingly shown on-screen preferably animating object movement against relative map data. Preferably, object recognition and condition monitoring, including any monitored changes thereto, are achieved. Such object processing is achieved via visual, video, or image processing, as described herein for optional module 168, to recognize or correlate particular observable object attributes, and/or by GPS or other radio triangulation positional signal information and any corresponding sensed object identifier or signature information, as determined over different or scheduled monitoring times. Preferably, any substantial difference of measured location values are reconciled in favor of GPS location calculation over other position or navigation scheme, particularly when selective availability (SA) thereto is set substantially to zero.

Object movement relative to appropriate map overlay may be illustrated, for example, in two or three dimensions statically or dynamically. In this way, each object instance may be symbolically represented by reduced-size or thumbnail graphical or textual icon or avatar on output display.

Then, object movement diagnosis, corrective-action, or transaction processing is performed 210. In this regard, data processing may be case- or application-specific as described herein to the extent that user or object condition changes warrant case-specific diagnosis, correction, remote repair, or transaction services.

In accordance, with one aspect of present invention, improved methodology and system are provided to determine remote and/or local mobile object movement. Such movement is based on monitored or detected data from one or more fixed detectors coupled to Internet or other networking interconnection. Further, such movement determination is employed in subsequent process activity, such as targeted commercial transaction, remote health care, public or private facility, goods, mobile, or staff surveillance.

For example, upon indication by mobile target unit 4 of low-power source condition, integrated system facilitates via module 210 sleep mode operation and/or provisions for localized power supply by controller 6 notifying particular target unit 4 with low power source via network 8 and communicator 7 wireless connection of convenient or nearby re-charge outlet or battery inventory.

Finally, as shown, performance report may be generated and/or delivered preferably according to schedule or request as well as targeted delivery site according to requester or object locale. Ongoing console display of monitored objects, movement, maps, flags, etc. may be provided. Then, database is updated accordingly 212, for example, when excessive or unscheduled object presence or movement is detected. As appropriate, steps are repeated 213, or adapted according to any revised initialization values, to accommodate further object movement. Optionally, software 66 may employ neural-based or adaptive learning for high-transaction processing for tracking real-time data associated with multiple object surveillances and/or movements.

Therefore, to summarize key features of inventive methodology and system, following general steps are provided in brief sequential format as implemented in preferred solution:

1. Integrated Overlay. Provide integrated surveillance and communication system, wherein mobile units are overlaid with fixed detector network. Both fixed and mobile units are accessible through the Internet.
2. Fixed Detection. Console user monitors object movement through multiple camera detectors coupled through the Internet.
3. Mobile Detection. Console user monitors object movement through mobile unit sensors and locators coupled wirelessly through the Internet.
4. Object Analysis. Control database and software combines fixed and mobile object data to monitor object movement relative to fixed surveillance sites. Fixed detectors observe object presence within certain area, while mobile sensor provide more accurate location as well as object sensor data. Database tracks historical, current, and predicted movement of object sets, thereby facilitating object search.
5. Processing Services. Commercial transactions deliver products and services more effectively to mobile object consumers. Secured access and graphical map outputs enhance system usefulness.

Although the principles of this invention have been illustrated in the preferred embodiment in accordance to a surveillance application, it is intended that the principles of this invention to be also applied to other applications, such as patient monitoring, person, vehicle, or property tracking and monitoring.

Thus, the foregoing described embodiments of the invention are provided as an illustration and description. It is not intended to limit the invention to the precise form described. Other variations and embodiments are possible in light of the above teaching, and it is thus intended that the scope of the invention not be limited by the detailed description, but rather by the claims as follow.

We claim:

1. A system comprising:
   a first fixed video detector and a second fixed video detector; and
   a controller configured to receive patient data from a mobile biomedical sensor associated with a patient, the controller is further configured to receive visual data from the first fixed video detector and the second fixed video detector, the controller is further configured to perform surveillance of the patient based on a combination of the visual data and the patient data;
   wherein the controller comprises a movement module configured to conduct real-time analysis of the patient in a first observation range of the first fixed video detector and configured to extrapolate a predicted future location of the patient in order to determine a second observation range into which the patient is likely to roam in the future, wherein the second fixed video detector is activated in response to the extrapolation of the predicted future location of the patient in the second observation range.

2. The system of claim 1 wherein the controller is further configured to:
receive location data from a mobile locator associated with the patient; and
switch visual surveillance of the patient from the first fixed video detector to the second fixed video detector in response to the location data indicating the patient is expected to move from the first observation range to the second observation range.

3. The system of claim 1 further comprising a third fixed video detector, and wherein the movement module is further configured to:
receive location data from a mobile locator associated with the patient;
use the location data to predict patient movement; and
switch visual surveillance of the patient to the third fixed video detector in response to the prediction of patient movement.

4. The system of claim 1 wherein the movement module is further configured to:
access a database comprising a scheduled patient location; and
compare the scheduled patient location to an actual patient location determined using at least one of the first fixed video detector or the second fixed video detector.

5. The system of claim 1 wherein the controller is further configured to electronically deliver to the patient at least one of an audio stream or a video stream, as part of a commercial transaction, in response to a combination of the visual data and the patient data.

6. The system of claim 1 wherein the surveillance of the patient comprises monitoring patient movement.

7. The system of claim 6 wherein the monitoring of patient movement comprises selecting, in response to the predicted future location into which the patient is imminently expected to move, the first fixed video detector or the second fixed video detector to monitor the patient.

8. The system of claim 1 wherein the surveillance of the patient comprises controlling the first fixed video detector or the second fixed video detector in response to a medical state of the patient exceeding a predetermined allowable range.

9. The system of claim 1 wherein the controller is further configured to collect additional patient data from the mobile biomedical sensor in response to an analysis of the visual data.

10. A digital storage device having stored thereon computer-executable instructions that, if executed by an object monitoring system, cause the object monitoring system to perform operations comprising:
receiving patient data from a mobile biomedical sensor associated with a patient;
receiving visual data from a fixed video detector;
performing corroborative surveillance of the patient by real-time analysis of the visual data and the patient;
extrapolating a predicted future location of the patient in order to obtain a second observation range into which the patient is likely to roam in the future; and
activating, in real time, a second fixed video detector in response to the extrapolating the predicted future location of the patient in the second observation range.

11. The digital storage device of claim 10, the operations further comprising collecting additional patient data from the mobile biomedical sensor in response to an analysis of the visual data.

12. A method comprising:
conducting real-time analysis of a patient located in a first observation range covered by a first fixed video detector;
receiving patient data from a biomedical sensor;
receiving positional data from a locator;
extrapolating a predicted future location of the patient in order to obtain a second observation range into which the patient is likely to roam in the future;
activating, in real time, a second fixed video detector in response to the extrapolating the predicted future location of the patient in the second observation range; and
performing corroborative surveillance of the patient by combined real-time analysis of visual data, the positional data, and the patient data.

13. The method of claim 12, further comprising tracking the patient from the first observation range to the second observation range covered by the second fixed video detector as the patient moves from the first observation range to the second observation range, wherein the tracking is performed in response to sensing a first GPS signal indicating the patient's location in the first observation range and a second GPS signal indicating the patient's subsequent location in the second observation range.

14. The method of claim 13 further comprising conducting real-time tracking of the patient in the second observation range of the second fixed video detector in response to the extrapolating the predicted future location of the patient into the second observation range.

15. The method of claim 12 further comprising comparing a stored patient location obtained from a database to a location in which the patient is observed by at least one of the first fixed video detector or the second fixed video detector.

16. The method of claim 12 wherein the biomedical sensor is coupled to a wireless device configured to transmit the patient data to a controller.

17. The method of claim 12 further comprising electronically delivering to the patient at least one of an audio stream or a video stream, as part of a commercial transaction with the patient, in response to at least one of a push software agent or a pull software agent using the visual data and at least one of the positional data or the patient data.

18. The system of claim 1, wherein a movement module is configured to determine the second observation range into which the patient is likely to roam based on at least one of an historical value of patient movement, a patient movement pattern, a predicted patient position, or a possible patient path.

19. The digital storage device of claim 10, wherein the object monitoring system comprises at least one of a controller or a target unit.

20. The method of claim 12, wherein the activating the second fixed video detector comprises handing off to the second fixed video detector roaming patient data.

21. The method of claim 12, further comprising simulating expected patient behavior in response to the extrapolating the predicted future location of the patient, and activating the second fixed video detector in response to the simulating the expected patient behavior, wherein the activating the second fixed video detector occurs in response to the patient being imminently expected to move into the second observation range.

* * * * *

UNITED STATES PATENT AND TRADEMARK OFFICE
CERTIFICATE OF CORRECTION

PATENT NO. : 7,830,962 B1
APPLICATION NO. : 11/394554
DATED : November 9, 2010
INVENTOR(S) : Fernandez et al.

Page 1 of 1

It is certified that error appears in the above-identified patent and that said Letters Patent is hereby corrected as shown below:

Column 2, line 30, delete "etc.)." and insert -- etc. --.

Column 3, line 18, delete "Hyper Text" and insert -- HyperText --.

Column 4, line 59, delete "IEE1394" and insert -- IEEE1394 --.

Column 8, lines 37-38, delete "structure 161," and insert -- structure 162, --.

Column 8, line 49, delete "network 6." and insert -- network 8. --.

Column 10, line 58, delete "4,6" and insert -- 4, 6 --.

Column 21, line 63, in Claim 10, delete "real time," and insert -- real-time, --.

Column 22, line 13, in Claim 12, delete "real time," and insert -- real-time, --.

Signed and Sealed this
Twenty-sixth Day of June, 2012

David J. Kappos
*Director of the United States Patent and Trademark Office*